United States Patent Office 3,810,861
Patented May 14, 1974

3,810,861
SELF-EXTINGUISHING REINFORCED POLY-AMIDE MOULDING COMPOSITIONS
Peter Tacke, Krefeld-Bockum, and Karl-Heinz Hermann, Krefeld, Germany, assignors to Bayer Aktiengesellschaft, Leverkusen, Germany
No Drawing. Filed Aug. 17, 1972, Ser. No. 281,299
Claims priority, application Germany, Aug. 17, 1971,
P 21 41 036.6
Int. Cl. C08g 51/10, 51/58
U.S. Cl. 260—37 N 4 Claims

ABSTRACT OF THE DISCLOSURE

Self-extinguishing polyamide moulding compositions which contain from 1 to 25% by weight, based on the whole composition, of at least one organic halogen compound having a halogen-content from 20 to 86% by weight, and from 1 to 25% by weight, based on the whole composition, of a mixture of an oxide selected from the group consisting of zinc oxide and iron oxide and at least one salt of a metal in Groups 1a, 2a or 2b of the Periodic System of Elements and a weak acid selected from the group consisting of an aliphatic carbon acid having 1 to 4 carbon atoms, an oxygen acid from an element in Groups 3a, 4a, 5a, or 6a of the Periodic System of Elements and $H_2S$.

---

This invention relates to self-extinguishing non-drip polyamide moulding compositions which contain organic halogen compounds and mixtures of zinc oxide or iron oxide with salts of metals in Group 1a, 2a or 2b of the Periodic System of Elements (Handbook of Chemistry and Physics, 47th edition (1966), page B–3, Chemical Rubber Company, Cleveland, Ohio) and weak acids as fire-retarding additives, and to processes for producing moulding compositions of this kind.

It is known, for example from U.S.A. patent specification No. 3,418,267, that organic compounds of high halogen content in conjunction with, for example, zinc oxide, iron oxide or lead oxide, can make aliphatic polyamides flameproof. The products correspond to the American Standard ASTM–D 635 in properties relating to burning.

It is extremely difficult to produce pure 6-polyamide with an adequately flameproof finish in this way. Chemical materials used for articles that are exposed to the danger of fire are required to comply at least with Group SE I of the Underwriters' Laboratories (U.L.), Subject 94, in burning properties. In the tests stipulated in this Standard, test bars ¼ and ⅟₁₆ of an inch thick are exposed to a standard Bunsen flame (9 mm. tall) for 10 seconds in a vertical position. The bars must be extinguished at the latest 30 seconds after exposure to the flame and should not drip while burning.

Bars of 6-polyamide which have been made flameproof by known methods do not pass this test. The thin test bars are completely burned very easily. Materials reinforced with glass fibres, asbestos or other fillers behave particularly unfavorably. Even in cases where, in addition to the organic halogen compound, zinc oxide or iron oxide is added in a quantity of up to 15% by weight to polyamides reinforced with glass fibres, the moulding composition obtained does not pass this fire test. In addition, such a large addition of flameproofing agent adversely affects the mechanical properties of the polyamide moulding compositions adversely and irreversibly.

In addition, 6-polyamide or mixtures of 6,6-, 11-, or 12-polyamide with a predominant 6-polyamide content show a tendency towards depolymerization under the effect of heat generated by a flame and the caprolactam so formed promotes complete combustion of the moulding composition. Glass-fibre-reinforced 6-polyamide shows this unfavorable behaviour to an even greater extent.

Surprisingly, it has now been found that, following their incorporation into polyamide moulding compositions, organic halogen compounds in conjunction with mixtures of zinc oxide or iron oxide and salts of metals in Group 1a, 2a or 2b of the Periodic System of Elements (Handbook of Chemistry and Physics, 47th edition (1966), page B–3, Chemical Rubber Company, Cleveland, Ohio) and weak acids can make these polyamide moulding compositions flameproof to such an extent that they comply with Group SE I of U.L., subject 94, in their burning properties.

Accordingly, the invention relates to self-extinguishing polyamide moulding compositions which contain from 1–25% by weight, based on the whole composition of at least one organic halogen compound having a halogen-content from 20–86% by weight, and from 1–25% by weight, based on the whole composition, of a mixture of an oxide selected from the group consisting of zinc oxide and iron oxide and at least one salt of a metal of Groups 1a, 2a or 2b of the Periodic System of Elements and a weak acid selected from the group consisting of an aliphatic carbon acid having 1 to 4 carbon atoms, an oxygen acid from an element in Groups 3a, 4a, 5a or 6a of the Periodic System of Elements and $H_2S$.

Suitable organic halogen compounds include any chloride and bromine compounds which can withstand incorporation into a polyamide moulding composition at temperatures around 300° C. Suitable are cycloaliphatic, mononuclear or polynuclear aromatic halogen compounds such as $C_{10}Cl_{12}$ (dechloranes), decachlorodiphenyl, decachlorodiphenyl ether, octachlorodiphenyl ether, hexabromodiphenyl ether, hexachlorobenzene, octachloronaphthalene, octachlorodibenzo - p - dioxine, chlorinated and/or brominated terphenyl, derivatives of tetrachlorophthalic acid and the corresponding bromoderivatives, and Diels Alder adducts of polyhalogenated cyclopentadienes on olefines such as described in Deutsche Offenlegungsschrift 1,569,021 for example the adduct of 2 mols hexachloro cyclopentadiene and 1 mol 1,5-cyclooctadiene. These substances are employed in quantities of from 2–25% by weight and preferably in quantities of from 6 to 15% by weight.

In conjunction with the aforementioned halogen compounds, from 1 to 25% by weight and preferably from 5 to 8% by weight of a mixture of zinc oxide or iron oxide and one or more salts of a metal of Groups 1a, 2a and 2b of the Periodic System and a weak acid produce SE I-non-inflammability in a polyamide moulding composition. By contrast, 12 and more percent by weight of zinc oxide or iron oxide alone, in conjunction with the halogen compounds, are unable to do this.

Large quantities of zinc oxide or iron oxide on their own are thus able to do far less as synergistic additives in respect of the halogen compound than small quantities of mixtures of zinc oxide or iron oxide with at least one salt of a metal in Group 1a, 2a or 2b of the Periodic System of Elements and a weak acid.

Zinc oxide or iron oxide ($Fe_2O_3$, $Fe_3O_4$) and the aforementioned salts are present in the mixtures in a ratio by weight of from 10:1 to 1:1 and preferably from 5:1 to 2:1.

Examples of salts of a metal in Group 1a, 2a or 2b of the Periodic System of Elements and a weak acid selected from the group consisting of aliphatic carbon acids having 1 to 4 carbon atoms, an oxygen acid from an element in Group 3a, 4a, 5a or 6a of the Periodic System of Elements and $H_2S$ include carbonates, formates, acetates, oxalates, borates, sulphides, silicates, stannites, stannates, plumbates, antimonates, etc., of, for example alkali or alkaline earth metals such as Na, K, Mg, Ca, Ba, or Zn. Salts of long-chain carboxylic acids, aromatic carboxylic acids or phenols are less suitable because a number of readily flammable organic substances are introduced with these salts into the polyamide moulding compositions.

One particular advantage of the mixtures of zinc oxide and the aforementioned salts is that polyamide moulding compositions which are finished with them are light in color. It is possible, for example by weak pigmentation, to produce white or light grey moulding compositions, something which is not possible in cases where iron oxide is used as a constituent of the fire-retarding mixture on account of its relatively strong natural color.

Polyamides which can be flameproofed in accordance with the invention include those of the type described generally in U.S.A. patent specification Nos. 2,071,250, 2,071,253, 2,130,948 and 3,015,652, for example, homopolyamides obtained by polymerizing amino acids and/or their lactams, such as ε-aminocaproic acid, 11-aminoundecanoic acid, 4,4-dimethylacetidinone, β-pyrrolidone, ε-caprolactam, oenanthic lactam, caprylic lactam or lauric lactam. Polyamides of the type obtained by polycondensing diamines, such as ethylene diamine, hexamethylene diamine, decamethylene diamine, dodecamethylene diamine, 2,2,4- or 2,4,4-trimethyl hexamethylene diamine, p- or m-xylylene diamine, bis(4-aminocyclohexyl)-methane, 3-aminomethyl-3,5,5-trimethylcyclohexyl amine or 1,4-diaminomethylcyclohexane, with a dicarboxylic acid, such as sebacic acid, heptadecane dicarboxylic acid, 2,2,4- or 2,4,4-trimethyl adipic acid, isophthalic acid or terephthalic acid, can also be flameproofed with the combination according to the invention, as can copolyamides of the kind obtained by polymerizing or polycondensing several of the aforementioned compounds.

The inventive combination is especially useful to produce self-extinguishing 6-polyamide reinforced with glass fibres.

In addition to the flameproofing agent, the polyamides can contain such additives as pigments, dyes, light and heat stabilizers, optical brighteners, plasticizers, chain terminators, lubricants and mould-release agents, and from 1 to 50% by weight of fillers and reinforcing agents such as kaolin, glass or asbestos fibres, talc, chalk, powdered quartz, carbon fibres, mica or feldspar.

The invention also relates to a process for the production of self-extinguishing polyamide moulding compositions, optionally containing fillers, which is distinguished by the fact that organic halogen compounds which are stable under the incorporation conditions, zinc oxide or iron oxide and one or more salts of a metal in Group 1a, 2a or 2b of the Periodic System of Elements and a weak acid as described above are incorporated into the polyamide moulding compositions either together or in succession. Fillers can be optionally incorporated with the flameproofing additives.

The aforementioned polyamide moulding compositions are eminently suitable for the production of flameproof injection mouldings.

EXAMPLE 1

(a) 100 g. of a very finely powdered decachlorodiphenyl (average particle diameter approximately 6μ), 60 g. of zinc oxide (very finely powdered) and 20 g. of calcium carbonate (precipitated, average particle diameter 2μ) were simultaneously incorporated at approximately 230° C. in a single-shaft extruder into 1 kg. of 6-polyamide reinforced with 30% by weight of glass fibres (average length approximately 250μ) and of relative viscosity 3.04 (as measured on a solution of 1 g. of polyamide in 99 g. of m-cresol at 25° C.). White polyamide test bars measuring 1.6 x 12.7 x 128 mm. and 6.4 x 12.7 x 128 mm. were injection-moulded from the product. In a flame test carried out in accordance with the Specification of Underwriters' Laboratories (U.L.), subject 94, in which the vertically arranged test bars were exposed for 10 seconds to a standard Bunsen flame, the test bars continued burning for approximately 7 seconds, at most, for 10 seconds and did not drip. Thus, the product complies with Group SE I.

Comparison test (b) A composition as used in 1(a), except that 150 g. of ZnO instead of the ZnO/CaCO₃ mixture were incorporated into the reinforced 6-polyamide, was subjected to the flame test described above. In some cases, the test bars continued burning for longer than 60 seconds. A few thin bars were completely burnt. As prescribed by UL, subject 94 flame treatment was carried out for 10 seconds with a small standard Bunsen flame.

Comparison test (c) A composition as used in 1(a), except that 150 g. of very finely powdered red iron oxide were incorporated instead of the ZnO/CaCO₃ mixture was subjected to the flame test. The test on this product produced substantially the same results as in Example (b). Some of the thin test bars were completely burnt so that the material must be regarded as non-self-extinguishing in accordance with U.L., Subject 94.

EXAMPLE 2

As Example 1(a), except that 18 g. of very finely powdered anhydrous soda was incorporated into the reinforced 6-polyamide instead of 20 g. of CaCO₃. The test bars continued burning for only 4 seconds and did not drip during the flame test prescribed by U.L., subject 94.

EXAMPLE 3

80 g. of hexabromodiphenyl ether and a mixture of 60 g. of zinc oxide and 20 g. of calcium oxalate (both finely powdered) were incorporated at approximately 240° C. in a single-shaft extruder into 1 kg. of 6-polyamide reinforced with 30% by weight of glass fibres (as in Example 1). The white test bars with the dimensions quoted in Example 1 produced from this material complied with Group SE I of U.L., subject 94, in their inflammability, in other words they only continued burning for 7 seconds after exposure for 10 seconds to a standard Bunsen flame.

EXAMPLE 4

A mixture of 100 g. of decachlorodiphenyl, 60 g. of zinc oxide and 20 g. of dolomite (all finely powdered), was incorporated at approximately 250° C. into 1 kg. of a polyamide mixture consisting of 280 g. of 6,6-polyamide, 420 g. of 6-polyamide and 300 g. of glass fibres (average length approximately 250μ). The light grey test bars continued burning for 5 seconds and did not drip when tested according to U.L., group SE I.

EXAMPLE 5

1 kg. of granulated 12-polyamide was mixed with 300 g. of glass fibres (average length approximately 250μ), 120 g. of decachlorodiphenyl, 70 g. of zinc oxide and 25 g. of chalk and the resulting mixture homogenized at approximately 210° C. in a single-shaft extruder. White test bars produced from the material go out 8 to 10 seconds following removal of the flame and do not drip when tested according to U.L., group SE I.

EXAMPLE 6

80 g. of octachloronaphthalene, 60 g. of black iron oxide and 20 g. of barium carbonate (all finely powdered) were incorporated at approximately 240° C. into 1 kg. of 6-polyamide reinforced with 30% by weight of glass fibres (as in Example 1) in a single-shaft extruder. The test bars produced from the material continued burning for at most 14 seconds when tested according to U.L., group SE I.

What is claimed is:

1. A self-extinguishing polyamide moulding composition which contains from 1 to 50% by weight of a fibre reinforcing agent, from 6 to 15 weight, based on the whole composition, of at least one organic halogen compound selected from the group consisting of a cycloaliphatic, mononuclear or polynuclear aromatic halogen compound and a Diels Alder adduct of a polyhalogenated cyclopentadiene on olefines, and having a halogen-content from 20 to 86% by weight, and from 5 to 8% by weight, based on the whole composition, of a mixture of an oxide selected from the group consisting of zinc oxide and iron oxide and of at least one salt of a metal selected from the group consisting of Zn, Na, K, Ca, Ba and Mg and of a weak acid selected from the group consisting of an aliphatic carbon acid having 1 to 4 carbon atoms, an oxygen acid from an element in Groups 3a, 4a, 5a or 6a of the Periodic System of Elements and $H_2S$, the oxide and the salt being present in the mixture in a weight ratio of from 10:1 to 1:1.

2. A polyamide composition as claimed in claim 1 which contains as said halogen compound a material selected from the group consisting of $C_{10}Cl_{12}$ (dechloranes), decachlorodiphenyl, decachlorodiphenyl ether, octachlorodiphenyl ether, hexabromodiphenyl ether, hexachlorobenzene, octachloronaphthalene, chlorinated and/or brominated terphenyl, octachlorodibenzo-p-dioxine, the adduct of 2 mols hexachlorocyclopentadiene and 1 mol 1,5-cyclooctadiene.

3. A polyamide composition as claimed in claim 1 which contains as said metal salt a material selected from the group consisting of a carbonate, formate, acetate, oxalate, borate, sulphide, silicate, stannite, stannate, phenolate and antimonate.

4. A polyamide composition as claimed in claim 1 which contains a material selected from the group consisting of 6-polyamide, 6,6-polyamide, 11-polyamide, 12-polyamide and mixtures thereof.

References Cited

UNITED STATES PATENTS

| | | | |
|---|---|---|---|
| 2,862,284 | 12/1958 | Wiszer | 28—82 |
| 2,919,258 | 12/1959 | Dietzusza | 260—37 |
| 2,205,722 | 6/1940 | Graves | 260—37 |
| 3,418,267 | 12/1968 | Busse | 260—33.8 |
| 2,978,340 | 4/1961 | Veatch | 106—40 |
| 3,304,282 | 2/1967 | Cadus | 260—37 |
| 3,422,048 | 1/1969 | Cunnelongo | 260—285 |
| 3,418,263 | 12/1968 | Hendersinn | 260—23 |

FOREIGN PATENTS 294,325    1965    Australia.

ALLAN LIEBERMAN, Primary Examiner

R. ZAITLEN, Assistant Examiner

U.S. Cl. X.R.

260—41 B